(12) United States Patent
Voutilainen (10) Patent No.: US 8,645,738 B2
(45) Date of Patent: Feb. 4, 2014

(54) NONVOLATILE DEVICE

(75) Inventor: Martti Kalevi Voutilainen, Espoo (FI)

(73) Assignee: Nokia Corporation (FI)

( * ) Notice: Subject to any disclaimer, the term of this patent is extended or adjusted under 35 U.S.C. 154(b) by 429 days.

(21) Appl. No.: 12/606,842

(22) Filed: Oct. 27, 2009

(65) Prior Publication Data

US 2011/0099405 A1  Apr. 28, 2011

(51) Int. Cl.
*G06F 1/32*  (2006.01)
*G06F 1/26*  (2006.01)

(52) U.S. Cl.
USPC ........... 713/324; 713/300; 713/310; 713/320; 713/323

(58) Field of Classification Search
None
See application file for complete search history.

(56) References Cited

U.S. PATENT DOCUMENTS

| 4,977,537 | A  | * | 12/1990 | Dias et al. ...................... 711/106 |
| 5,835,691 | A  | * | 11/1998 | Matsunoshita ............... 358/1.17 |
| 7,289,741 | B2 | * | 10/2007 | Kikuchi .......................... 399/12 |
| 7,337,277 | B2 | * | 2/2008  | Benhase et al. ............... 711/135 |
| 7,445,587 | B2 | * | 11/2008 | Kojima et al. .................. 483/56 |
| 7,802,116 | B2 | * | 9/2010  | Ravichandran ............... 713/320 |
| 2005/0132239 | A1 |   | 6/2005  | Athas et al. |
| 2006/0053326 | A1 | * | 3/2006  | Naveh et al. .................. 713/323 |
| 2007/0032228 | A1 |   | 2/2007  | Varanda |
| 2007/0291571 | A1 |   | 12/2007 | Balasundaram |
| 2008/0222371 | A1 | * | 9/2008  | Caulkins ....................... 711/154 |
| 2009/0141654 | A1 |   | 6/2009  | Voutilainen et al. |
| 2009/0172439 | A1 | * | 7/2009  | Cooper et al. ................. 713/323 |
| 2009/0235038 | A1 | * | 9/2009  | Sartore ......................... 711/162 |
| 2010/0058007 | A1 |   | 3/2010  | Yamauchi |
| 2011/0099405 | A1 | * | 4/2011  | Voutilainen ................... 713/324 |
| 2011/0179295 | A1 | * | 7/2011  | Jahagirdar et al. ............ 713/320 |

FOREIGN PATENT DOCUMENTS

| CN | 100347681       | 7/2007  |
| EP | 0621458         | 10/1994 |
| EP | 1 335 291 A1    | 8/2003  |
| JP | 2009009388      | 1/2009  |
| KR | 20040039709     | 5/2004  |
| WO | 2008/022882 A1  | 2/2008  |
| WO | 2009015285      | 1/2009  |

OTHER PUBLICATIONS

Computer Dictionary, 1994, Microsoft Press, Second Edition, p. 271.*

(Continued)

*Primary Examiner* — Tanh Nguyen
(74) *Attorney, Agent, or Firm* — Banner & Witcoff, Ltd.

(57) ABSTRACT

Apparatuses and methods may include receiving a power-down command at a first subsystem comprising a first processor, a first volatile memory, a first nonvolatile memory, a first compressor/decompressor, and a first power control circuit, the first volatile memory being configured to store state data relating to operating conditions of the first subsystem. In response to receipt of the power-down command, the apparatuses and methods may cause the first compressor/decompressor to compress the state data to generate compressed state data and to cause the compressed state data to be stored in the first nonvolatile memory. In response to storage of the compressed state data in the first nonvolatile memory, the apparatuses and methods may cause the first power control circuit to power down the first subsystem.

18 Claims, 3 Drawing Sheets

(56) References Cited

OTHER PUBLICATIONS

Tim J. Echtermeyer et al., Nonvolatile Switching in Graphene Field-Effect Devices, IEEE Electron Device Letters, vol. 29, No. 8, Aug. 2008, pp. 952-954.
Prachi Patel, Technology Review: Making Graphine More Practical, A novel process yields big pieces of single-ply graphene for smaller, faster electronics, Nov. 18, 2008, pp. 1-3.
Vincent C. Tung et al., High-throughput solution processing of large-scale graphene, Nature Nanotechnology, vol. 4, Nov. 2008, pp. 25-29.
PCT/FI2010/050690 International Search Report dated Jan. 18, 2011.
European Application No. EP 10 82 6159.5—Supplementary European Search Report dated Feb. 21, 2013.

* cited by examiner

NONVOLATILE DEVICE

BACKGROUND

Consumers desire to have services available on their devices at all times and in all locations. To meet these desires using conventional complementary metal oxide semiconductor (CMOS) technologies, all relevant circuitry of a device always has to be turned on thereby consuming power even when not in use. Always powering infrequently used circuitry wastes power and detrimentally affects battery performance. Moreover, conventional mobile devices often cannot execute tasks energy-efficiently on general purpose processors. Very simple tasks may be performed by powerful processors, whereas real-time, low-latency tasks may be performed by less powerful processors resulting in undesired delay.

SUMMARY

The following presents a simplified summary of some example embodiments to provide a basic understanding. This summary is not an extensive overview, and is not intended to identify key or critical elements or to delineate the scope of the claims. The following summary merely presents some concepts and example embodiments in a simplified form as a prelude to the more detailed description provided below.

Apparatuses and methods can provide improved power consumption by turning off one or more multi-processor subsystems when not in use. The multi-processor subsystems each have a nonvolatile memory storing state data that can be rapidly retrieved when required to turn back on. The multi-processor subsystems can thus appear to be turned on when, in fact, they are not.

According to at least some aspects, apparatuses and methods can include receiving a power-down command at a first subsystem comprising a first processor, a first volatile memory, a first nonvolatile memory, a first compressor/decompressor, and a first power control circuit, the first volatile memory being configured to store state data relating to operating conditions of the first subsystem. In response to receipt of the power-down command, the apparatuses and methods may cause the first compressor/decompressor to compress the state data to generate compressed state data and to cause the compressed state data to be stored in the first nonvolatile memory. In response to storage of the compressed state data in the first nonvolatile memory, the apparatuses and methods may cause the first power control circuit to power down the first subsystem.

BRIEF DESCRIPTION OF THE DRAWINGS

A more complete understanding of the present disclosure and the advantages thereof may be acquired by referring to the following description in consideration of the accompanying drawings, in which like reference numbers indicate like features and wherein:

FIG. 2 illustrates an example flow diagram for decompressing current state data when turning a subsystem back on.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
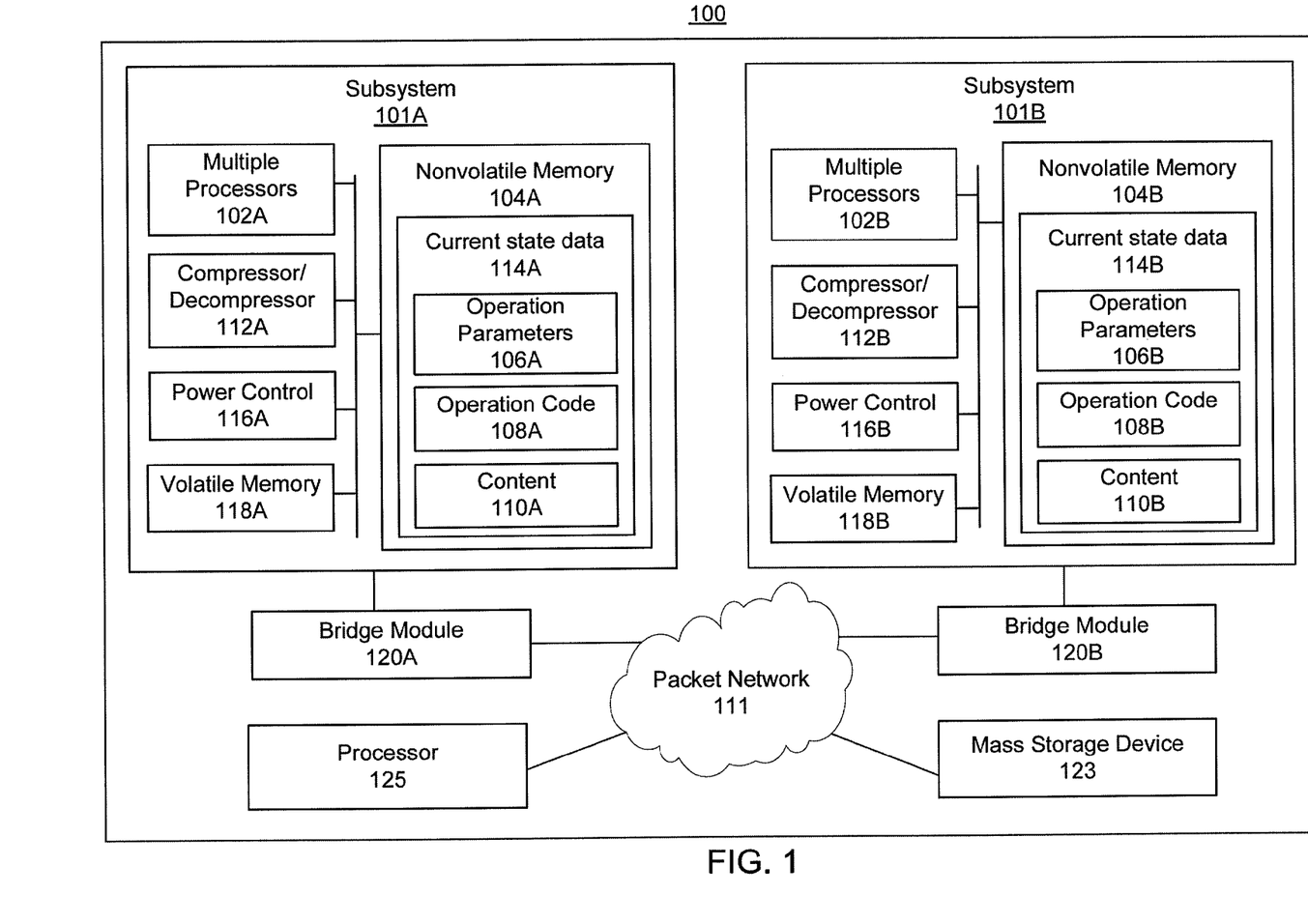
FIG. 1 shows an exemplary device having multiple multi-processor subsystems.

FIG. 1 shows an example device 100 configured to have its multi-processor subsystems 101A and 101B appear to be turned on when in fact certain subsystems have been turned off. The subsystems 101 can retrieve locally stored state data to rapidly turn back on.

The device 100 may be, for example, a mobile phone, a computer, a PDA, a laptop, or other computational device. The device 100 may include a processor 125 and a mass storage device 123 storing computer readable instructions that, when executed, cause the device 100 to perform the functions described herein. Examples of a mass storage device 123 include a hard disk and a Flash memory, as well as other types of mass storage devices.

The device 100 can also include multiple multi-processor subsystems 101. FIG. 1, for example, depicts device 100 having two subsystems 101A and 101B, but the device 100 may include any number of subsystems. The device 100 may selectively turn on and off one or more of the multi-processor subsystems 101 at respective times to control power consumption. For example, a mobile phone may turn off a multi-processor subsystem 101 providing a camera when not in use.

The multi-processor subsystems 101 may include hardware and/or software optimized to perform a particular computational task based on, for example, latency requirements and processing bandwidth. A subsystem 101 may be a limited-purpose unit that communicates with other subsystems with messages, such as the one described in U.S. application Ser. No. 11/999,314, filed Dec. 4, 2007, titled "Multi-Processor architecture for a device," and published as U.S. PreGrant Pub. No. 2009/0141654, the contents of which are incorporated herein by reference in their entirety. Every subsystem 101 may be optimized for one or a limited number of purposes. As such, a subsystem 101 can use very efficient hardware processing instead of software. Hardware processing may use fixed logic with a small amount of software stored in the nonvolatile memory 104 to give some flexibility. For example, the device 100 may be a mobile phone running a simple operating system (e.g., Symbian) primarily providing a user interface controller. The operating system may process user input (e.g., take a video clip) received by the user interface controller to generate and allocate task requests to optimized subsystems 101.

The device 100 may allocate tasks to the multi-processor subsystems 101 based on performance characteristics required to perform a particular computational task. For example, the device 100 may receive a request to perform a task, may determine which multi-processor subsystem 101 is suited to perform the requested task, and may cause the identified multi-processor subsystem 101 to perform the task. For example, a subsystem 101A may be optimized for performing decompression and may receive a task request with instructions to uncompress a predetermined number of data frames into a 1920×1080 pixel picture and send to a display subsystem 101B. As another example, one subsystem 101A may be capable of performing a task requiring real-time, very low latency, and high bandwidth computing, such as for handling of graphics data in game applications. A different subsystem 101B may be capable of performing a task supporting sensor data handling that typically has very long latencies without performance degradation. Example multi-processor subsystems 101 may include supercomputers, video processors, nanotechnology computers, an Audio Codec subsystem, an Audio Codec including a stereo speaker power amplifier with a stereo headphone amplifier.

With embodiments such as those shown in FIG. 1, the multi-processor subsystems 101 can be of various types, including: (1) A multipoint bus using time division multiplexing for multiprocessor subsystems for applications that have a small amount of data to be transmitted between processors but has connections between every processor of the multiprocessor unit; (2) switched network (circuit-switched) multiprocessor subsystems using very low-latency point-to-point connections through a cross-bar switch type network; (3) a packet switched network multiprocessor subsystem for applications that tolerate a long latency but require very large bandwidth; and (4) a shared block device for multiple processors. An example implementation of a shared block device is the shared use of a SDRAM or FIFO by several processors running the same operating system. Shared memory allows two or more processes to access common data structures by placing them in a shared memory segment. The shared block device may be used as hardware support or hardware acceleration of OS messaging (e.g., System V Interprocess Communication (IPC)).

The multiprocessor subsystems 101 can be connected to one another through bridge modules 120, in which one side (toward packet network 111) uses a packet network protocol and hardware (e.g., Spacewire or UniPro2) and the other (toward the multi-processor subsystem 101) uses a protocol and hardware specific to the associated multi-processor subsystem 101. An example architecture of the device 100, including bridge modules, such as the one described in U.S. application Ser. No. 11/999,314, filed Dec. 4, 2007, titled "Multi-Processor architecture for a device," and published as U.S. PreGrant Pub. No. 2009/0141654, the contents of which are incorporated herein by reference in their entirety.

The multi-processor subsystems 101 can connect to the central packet network 111 using an interface such as Spacewire (ECSS-E50-04A) or Mobile Industry Processor Interface (MIPI) Alliance Universal protocol (UniPro2). UniPro2 and Spacewire are only examples of packet network protocols. Other packet network protocols (e.g., Internet) may be used. Many communication methods (e.g., MIPI D-PHY and M-PHY used with UniPro2) may have multiple communication modes with different speeds, and the device 100 may instruct a subsystem 101 to use a particular mode. For example, the device 100 may use a squelch system to wake-up a subsystem 101, and specify slow speed or high-speed modes for control and super-speed for high bandwidth transmission.

A device 100 that is a mobile phone, for instance, can include relatively independent subsystems 101 that communicate via the central packet network 111 using energy-efficient packet-based methods like MIPI UniPro and M-PHY. Central packet network 111 can be connection-less (i.e., data is sent from one end point to another without prior arrangement.) However, other connection-less and connection-oriented network protocols can be used.

While the embodiment shown in FIG. 1 includes a single central packet network 111, some embodiments of the invention may utilize a communication network having any number of networks, in which no particular network may be considered to be central since the networks are merely connected to each other. The connections may form a chain of networks or a network of networks.

Each subsystem 101 can include multiple processors 102, a nonvolatile memory 104, a compressor/decompressor 112, a power control circuit 116, and a volatile memory 118. The multiple processors 102 can interact with each other using a bus, packet network, crossbar switch, or other communication path. The volatile memory 118 and/or nonvolatile memory 104 can store computer executable instructions that, when executed by one or more of the multiple processors 102, cause the subsystem 101 to perform the functions described herein. In an example embodiment, the nonvolatile memory 104 may be a spintronic memory composed of graphene transistors. A spintronic memory may also be referred to as a spin torque transfer memory. Companies developing Spin Torque Transfer Random Access Memory (STT-RAM) include EverSpin, Grandis, Hynix, IBM, Samsung, TDK and Toshiba. The nonvolatile memory 104 can also be a Phase-Change memory (PCM) available commercially from Numonyx, a Ferroelectric Random Access Memory (FeRAM), a magnetic flip flop (MFF), or a graphene field effect device.

For example, the nonvolatile memory 104 may be a FeRAM storage capable of storing 128 Megabits and having read/write speeds of 1.6 Gigabytes a second. The nonvolatile memory 104 may also be a MFF where MFF operations are produced by integrating data flip flop (DFF) with magnetic tunnel junctions (MTJ), in addition to circuits that switch the direction of the MTJ's magnetization. During operation, the MFF may be designed to prevent MTJs from affecting MFF clock frequency, as it can operation at the same frequency (e.g., 3.5 GHz) as the DFF. The nonvolatile memory 104 may also be a graphene nonvolatile field effect memory and, in an example, may have a difference of 5 orders of magnitude in resistivity between on and off states. Other nonvolatile memory technologies may also be used.

The power control circuit 116 may power down and up the subsystem 101 in response to commands received from the processor 125 or other subsystems 101. In an example, the power control circuit 116 can include a CMOS inverter and a power switch, where the CMOS inverter which turns on/off a power switch that controls power distribution to the subsystem 101. A CMOS inverter may consume little power (e.g., nanowatt or microwatt). In another embodiment, an Inter-Integrated Circuit ($I^2C$) bus can be used. Other types of power control circuits may also be used. The power control circuit 116 may be used to completely turn off the subsystem 101, or there can be several levels of power-saving states, defined, for example, in MIPI D-PHY and M-PHY standards.

Prior to powering down, a subsystem 101 may store current state data 114 in the nonvolatile memory 104 for quick retrieval and restoration of a previous state in the volatile memory 118 upon being powered back on. Current state data 114 may be stored in the local nonvolatile memory 104 when the subsystem 101 is turned off or when a power saving state would lose important information. Current state data 114 can include operating conditions such as, but not limited to, operation parameters 106, operation code 108, and content 110. The operation parameters 106 may be parameters in which mode communication will be started when next powered-up. Example parameters may be used in hardware-based JPEG compression. The operation code 108 may be executable runtime code. Example operation code includes an operating system (OS), such as, but not limited to, Symbian, Linux, or DOS. Operation code 108 is an example of computer executable instructions. The content 110 may be a Symbian OS.

The multi-processor subsystems 101 can access their respective nonvolatile memories 104 significantly faster than they can access a mass storage device 123 shared by all of the multi-processor subsystems 101. When powering up, it may take significantly longer for the multi-processor subsystems 101 to load data from the mass storage device 123 as compared with the time required to load data from their respective local nonvolatile memories 104. For instance, if the device 100 is an enterprise personal computer (PC) that has several subsystems 101, but without nonvolatile memories 104, then each would have to load data from the mass storage device 123 when the PC turns on thereby consuming power and time to access the data regardless of how frequently a particular subsystem 101 is used. Providing each subsystem 101 with a local nonvolatile memory 104 advantageously does not require turning on serial links to read data from the mass storage device 123.

In another example, use of shared transmission channels, such as implementing the packet network 111 as a UniPro2 network, can create latency because due to difficulties in efficiently using available bandwidth when device 100 is composed of both slow and fast subsystems 101 that are dynamically logically connected and disconnected from the device 100 (i.e., powered off/on or even physically disconnected by removing cable). For example, loading a 200 MB operating system using 1 Gbps UniPro2 network may only require (200 Mbit×8=1600) 1.6 seconds, but when bandwidth is shared with other applications, loading time can significantly increase. When locally storing operating system content in the nonvolatile memory 104 in the same integrated circuit (IC)-package as multiple processors 102, a 128-bit parallel interface could load 1600 Mbits of operating system content in 62.5 ms using a 200 Mbps memory interface. Thus, a subsystem 101 having its own nonvolatile memory 104 can yield significant improvements.

Moreover, a bottleneck could occur in conventional systems when powering up the PC as multiple subsystems 101 might simultaneously attempt to access the mass storage device 123. Providing each subsystem 101 with its own nonvolatile memory 104 as described herein advantageously decreases the power-up time as the subsystems 101 can simultaneously access their respective local nonvolatile memories 104, instead of competing with one another to access the mass storage device 123 as in conventional systems. A power-up time refers to the amount of time between when a subsystem 101 is first provided with power to when the subsystem 101 can process data received from or send data via the packet network 111. Further, at start-up, the device 100 can individually power up the multi-processor subsystems 101 as needed while leaving others powered down thus resulting in power savings by not powering unneeded subsystems 101. Moreover, by having distributed nonvolatile memories 104, a significant amount of data transfer to and from the mass storage device 123 can be avoided. The total amount of storage capacity also can be reduced because each multi-processor subsystem 101 locally stores its data in its nonvolatile memory 104. The reduction can be achieved as the multiple processors 102 of each subsystem 101 are optimized for tasks they perform and the operating system can be matched to the task and processor hardware.

To turn off a subsystem 101, the device 100 may communicate a power-down command to instruct a particular subsystem 101 to turn off. A subsystem 101 may also communicate power-up and down commands to other subsystems. In an example embodiment, the device 100 may monitor activity of the subsystems 101 to determine whether to instruct one or more to turn off. The device 100 may issue a power-down command in response to monitored activity of a subsystem 101 falling below a threshold activity level, the user terminating an application provided by the subsystem 101, expiration of a timer, the user turning off the device 100, or in response to other events. For instance, non-time-critical subsystems 101 may turn off if no tasks are active and no task requests have been received within pre-determined period of time. Prior to turning off, the subsystem 101 can store current state data 114 including operation code 108, content 110, and parameters 106 in its local nonvolatile memory 104, and not in device-wide mass storage device 123. If the local nonvolatile memory 104 is completely full, however, the multi-processor subsystem 101 may store the remaining current state data in the mass storage device 123.

In some embodiments, upon receipt of the power-down command, a subsystem 101 instructs the compressor/decompressor 112 to compress the operation parameters, content, and operation code stored in the volatile memory 118, and the compressor/decompressor 112 causes the compressed operation code, content, and parameters to be stored in the nonvolatile memory 104. Compression can be omitted if a nonvolatile memory 104 has sufficient storage capacity with a fast enough reading time. If the nonvolatile memory 104 has too slow of a reading time, it may be faster to read a small amount of compressed data and then decompress the compressed data with a fast decompression circuit. For example, if the nonvolatile memory 104 has a slow reading time, it may be faster to read a compressed image file and decompress it into a high-resolution picture rather than reading an uncompressed version of the image file.

Locally storing the current state data in a nonvolatile memory 104 may reduce power consumption and the time required to turn back on because the subsystem 101 does not have to retrieve the current state data 114 from the mass storage device 123. Further, a nonvolatile memory 104 can store data even when turned off thereby reducing power consumption of the device 100. For example, reading from mass storage device 123 requires turning on serial links (e.g., UniPro2) between a subsystem 101 and mass storage 123. This can take a long time and requires providing power to both the subsystem 101 and the mass storage 123 during a transfer that might take seconds. After storage, the subsystem 101 causes the power control circuit 116 to turn off the subsystem 101.

Because computational tasks may be assigned to a particular subsystem 101 and performed locally at the assigned subsystem 101, the amount of operation code 108 typically is small enough that local hardware-based compressors/decompressors 112 can compress/decompress the operation code 108 within a limited amount of time (e.g., within one microsecond) giving the user of the device 100 the impression that each of the multi-processor subsystems 101 is on all of the time, when, in fact, they are not. For instance, the local operation code 108 dedicated to hardware and software of a subsystem 101 may include only a few hundred lines of code, but in some cases, operation code for an operating system (e.g., Symbian OS) might be large (e.g., 1 GB or more), requiring a large amount of storage in the local nonvolatile memory 104.

The compressor/decompressor 112 also may be implemented in software depending on performance requirements. Longer compression/decompression times can be tolerated as long as the computational task to be performed by a subsystem 101 is relatively longer than the time required for compression/decompression to give the user the impression that services provided by the subsystems 101 are available without undue delay. When powered off, the power control circuit 116 may monitor the packet network 111 for a power-up command.

At some later time, the device 100 or another subsystem 101 may decide to power back up a subsystem 101 and communicate a power-up command to the subsystem 101 via the packet network 111. For instance, the device 100 may determine that the user has requested a computational task suited to be performed by a powered down subsystem 101.

Also, a subsystem 101 may wake up at predetermined time periods when a task is scheduled to be performed. For example, cellular or WLAN modem subsystems may have a predefined timeslot when data is transmitted for a particular user in air interface.

When powering back up, the subsystem 101 may retrieve the compressed current state data 114 from the nonvolatile memory 104 and instruct the compressor/decompressor 112 to perform decompression to recover the current state data. The subsystem 101 may then cause the current state data to be stored in the volatile memory 118 to recover its state before it was powered down. For example, the current state data 114 can be uncompressed and loaded into the volatile memory 118 that may be a static random access memory (SRAM). Also, the volatile memory 118 can be omitted and the current state data can be uncompressed and used directly from nonvolatile memory 104 if designed to function as executable memory similar to a RAM.

Figure 2:
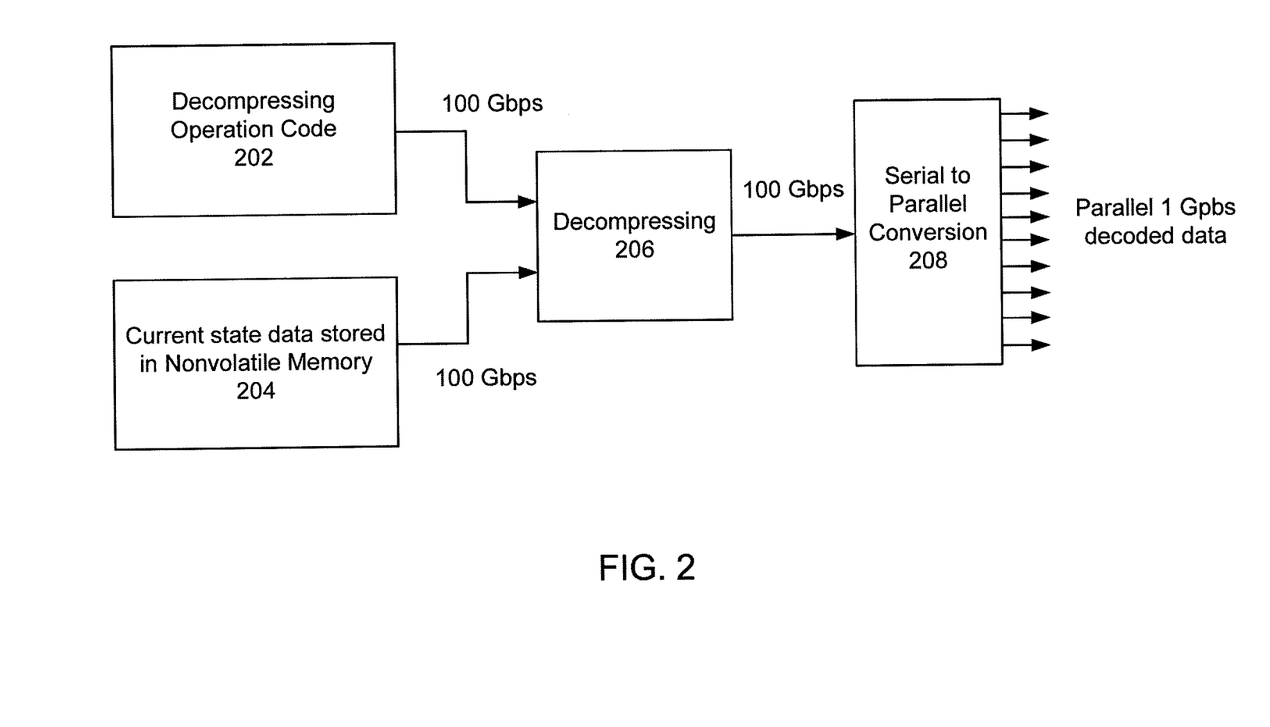

FIG. 2 illustrates an example flow diagram for decompressing current state data 114 when turning a subsystem 101 back on. The depicted embodiment provides ultra-fast decompression of compressed operation code stored in a serial format using Terahertz (THz) grapheme transistors and conversion into parallel data for a 1 gigahertz (GHz) CMOS system. Traditionally, decompression is done using parallel data and parallel processors using wide parallel buses running at 100 MHz-4 GHz (e.g., in PCs).

The compressor/decompressor 112 may perform computations using serial 1-bit data content and 1-bit code at an ultra high frequency. The compressor/decompressor 112 can directly perform compression or decompression on data (e.g., video) with serial data coming from a nonvolatile memory IC having an ultra high frequency serial port. For example, the ultra high frequency serial port provides data at 5-50 Gbps or even at Tbps bit rates or higher. Advantageously, performing computations using serial 1-bit data content and 1-bit code at an ultra high frequency permits use of ultra-fast computing elements, and the serial data is then converted to a parallel form for use by CMOS processors. Because current ultra-fast computing elements may not yet be mature enough for wide-scale mass production similar to silicon CMOS, special computing structures for the compressor/decompressor 112, as well as the other processing units (e.g., processors 102, etc), may be composed of a small number of active elements, such as, but not limited to, graphene/nanotube FET-type transistors, Carbon Nanotubes (CNT), or resonance tunnel diodes (RTD) based logic gates.

In block 202, the compressor/decompressor 112 may retrieve decompressor operation code from operation code 108 stored in nonvolatile memory 104. In block 204, the compressor/decompressor 112 may retrieve current state data 114 stored in the nonvolatile memory 104 in a compressed format at a rate of 100 Gigabits per second (Gbps). In block 206, the compressor/decompressor 112 may decompress the compressed current state data at a rate of 100 Gbps. In block 208, the compressor/decompressor 112 may perform serial to parallel conversion of the decompressed data at a rate of 100 Gbps to output parallel 1 Gpbs of decompressed data. In some systems, CMOS processors and other computing structures are designed to use parallel data. Conversion of decompressed content from a serial format into parallel format permits use by CMOS processors and other computing structures.

To further reduce power consumption, the device 100 may limit the amount of information communicated between multi-processor subsystems 101 via the packet network 111. When a multi-processor subsystem 101 performs a task that changes any of operation parameters, content, and operation code used by at least one other subsystem 101, the multi-processor subsystem 101 may communicate a change message via the packet network 111 to the at least one other subsystem 101. The change message may include only the information describing the change ("change information") in a compressed format, and not all of the data affected by the change.

In an example, a device 100 may be a mobile phone having a video camera subsystem 101A and a display subsystem 101B. The video camera subsystem 101A initially captures image content data and communicates the image content data to the display subsystem 101B for display. Over time, the video camera subsystem 101A captures new image content data and determines a difference with the earlier image content data. The video camera subsystem 101A then communicates change data (e.g., changed pixels), and not all of the new image content data, to the display subsystem 101B. The display subsystem 101B then modifies the earlier image content data using the change data to generate updated image content data for display. This method may also be used for other types of devices that display content, such as, but not limited to, digital television terrestrial/cable/satellite content transmission that communicates pictures at predetermined intervals (e.g., every 20 ms) and reference frames less frequently. The changes to a reference frame may not be sent until a next reference frame is sent.

Figure 3:
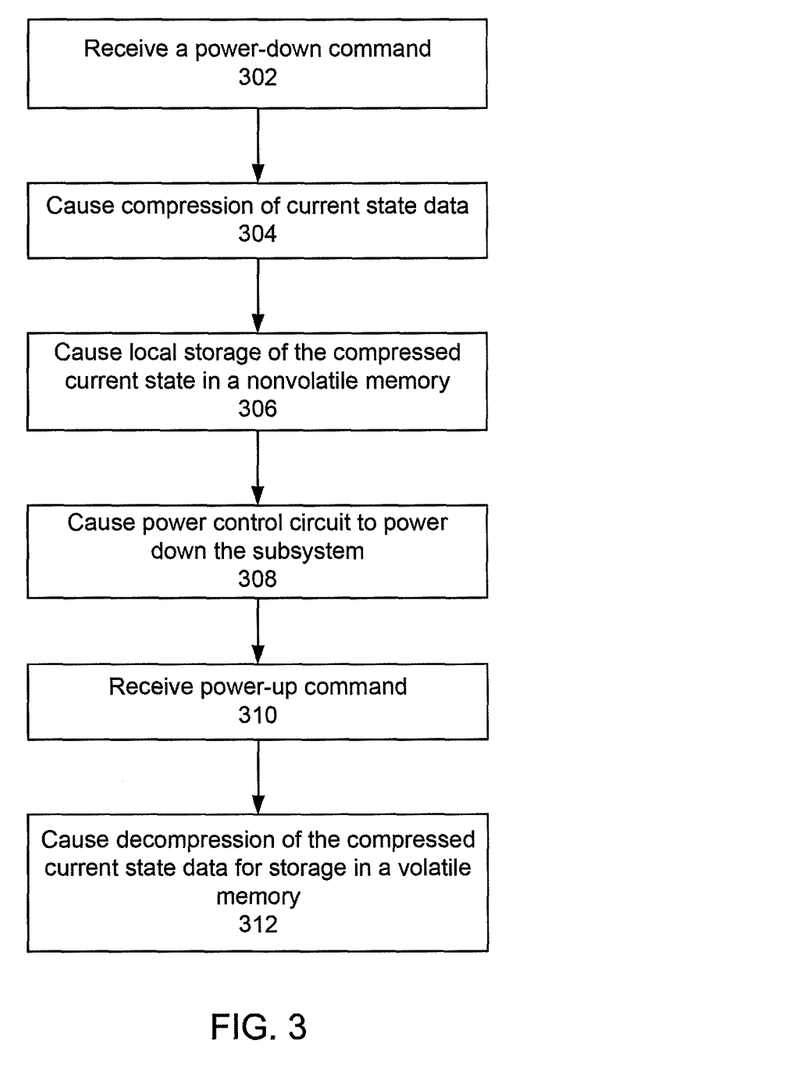
FIG. 3 illustrates an example flow diagram a method for powering up and down a subsystem.

FIG. 3 illustrates an example flow diagram of a method for powering up and down a subsystem. In block 302, the method may include receiving a power-down command.

The device 100 may determine that one of its subsystems 101 is infrequently used and can be powered down. The device 100 may communicate a power-down command to the subsystem 101 via the packet network 111.

In block 304, the method may include causing compression of current state data for the subsystems. The subsystem 101 may cause current state data to be provided to the compressor/decompressor 112 from the volatile memory 118 along with a compress instruction to cause the compressor/decompressor 112 to compress the current state data. For example, a current state data could be an operating system (OS), communication parameters specifying what bit rate to use when powered-up next, and a screensaver photograph to display.

In block 306 the method may include causing local storage of the compressed current state data in a nonvolatile memory. The compressor/decompressor 112 may communicate the compressed current state data for storage in nonvolatile memory 104.

In block 308, the method may include causing a power control circuit to power down the subsystem 101 in response to the compressed current state data being stored in the nonvolatile memory 104.

In block 310, the method may include receiving a power-up command. The device 100 may determine that a subsystem 101 is suited to perform a certain computational task, and may communicate a power-up command to that subsystem 101. The power control circuit 116 may cause the subsystem to turn on in response to receiving the power-up command. The power-up command may identify the type of task to be performed or the subsystem 101 may inform the device 100 of the task after it has powered up.

In block 312, the method may include retrieving and decompressing current state data to restore the state of the subsystem in response to receiving the power-up command. The subsystem 101 may cause the compressor/decompressor 112 to retrieve compressed current state data 114 from the nonvolatile memory 104 and decompress the current state data. The compressor/decompressor 112 may then cause the current state data to be stored in the volatile memory 118 to recreate the previous state prior to turning off. The method of FIG. 3 may then end.

Accordingly, the device 100 can instruct one or more multi-processor subsystems 101 not currently being used to turn off, thereby reducing static power consumption that would otherwise occur when a particular subsystem 101 is turned on even though not currently in use. A nonvolatile memory 104 may locally store current state data 114 allowing a subsystem 101 to quickly restore its previous state to appear as if it is turned on even though powered off.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. An apparatus comprising:
 a first subsystem comprising a first processor, a first volatile memory, a first nonvolatile memory, a first compressor/decompressor, and a first power control circuit; and
 a second processor coupled to the first subsystem, wherein the second processor is configured to determine that the first subsystem is not needed, generate a first power-down command and communicate the first power-down command to the first subsystem;
 wherein the first processor is configured to:
 upon receipt of the first power-down command, cause:
  the first compressor/decompressor to compress state data retrieved from the first volatile memory to generate compressed state data, wherein the state data relates to operating conditions of the first subsystem,
  the first nonvolatile memory to store the compressed state data, and
  the first power control circuit to power down the first subsystem,
 wherein the first subsystem is configured to communicate a second power-down command to a second subsystem.

2. The apparatus of claim 1, wherein the first processor is further configured to:
 upon receiving a power-up command from the second processor:
  cause the first compressor/decompressor to decompress the compressed state data stored in the first nonvolatile memory, and
  cause the decompressed state data to be stored in the first volatile memory.

3. The apparatus of claim 2, wherein the first subsystem is configured to perform a computation task using the decompressed state data after storage in the first volatile memory.

4. The apparatus of claim 1, wherein the first subsystem is configured to:
 perform a task that changes the state data; and
 communicate, to the second subsystem, a change message identifying the change in the state data, wherein the second subsystem comprises a third processor, a second volatile memory, a second nonvolatile memory, a second compressor/decompressor, and a second power control circuit.

5. The apparatus of claim 1, wherein the first nonvolatile memory is a spintronic memory.

6. The apparatus of claim 1, wherein the second processor is configured to monitor an activity level of the first subsystem, and wherein the second processor is configured to generate the first power-down command in response to the activity level falling below a threshold activity level.

7. A method comprising:
 storing, in a first volatile memory, state data relating to operating conditions of a first subsystem, wherein the first subsystem comprises a first processor, a first nonvolatile memory, a first compressor/decompressor, a first power control circuit, and the first volatile memory;
 receiving a first power-down command at the first subsystem;
 in response to receipt of the first power-down command:
  compressing the state data using the first compressor/decompressor, resulting in compressed state data, and
  storing the compressed state data in the first nonvolatile memory;
 in response to storage of the compressed state data in the first nonvolatile memory, powering down the first subsystem using the first power control circuit; and
 communicating, by the first subsystem, a second power-down command to a second subsystem.

8. The method of claim 7, further comprising:
 receiving a power-up command; and
 in response to the power-up command, decompressing, using the first compressor/decompressor, the compressed state data stored in the first nonvolatile memory and storing, in the first volatile memory, the decompressed state data.

9. The method of claim 8, further comprising performing, by the first subsystem, a computation task using the decompressed state data after storage in the first volatile memory.

10. The method of claim 7, further comprising:
 performing, by the first subsystem, a task that changes the state data; and
 communicating, to the second subsystem, a change message identifying the change in the state data.

11. The method of claim 7, further comprising monitoring an activity level of the first subsystem and generating the first power-down command in response to the activity level falling below a threshold activity level.

12. A non-transitory computer-readable medium storing computer-executable instructions that, when executed, cause an apparatus at least to:
 store, in a first volatile memory, state data relating to operating conditions of a first subsystem, wherein the first subsystem comprises a first processor, a first compressor/decompressor, a first power control circuit, the first volatile memory, and a first nonvolatile memory;
 receive a first power-down command at the first subsystem;
 in response to receipt of the first power-down command:
  compress state data using the first compressor/decompressor, resulting in compressed state data, and
  store the compressed state data in the first nonvolatile memory;
 in response to storage of the compressed state data in the first nonvolatile memory, power down the first subsystem using the first power control circuit; and
 communicate by the first subsystem a second power-down command to a second subsystem.

13. The non-transitory computer-readable medium of claim 12, wherein the computer-executable instructions, when executed, cause the apparatus to:
receive, at the first processor, a power-up command; and
in response to the power-up command, decompress, using the first compressor/decompressor, the compressed state data stored in the first nonvolatile memory and store the decompressed state data in the first volatile memory.

14. The non-transitory computer-readable medium of claim 13, wherein the computer-executable instructions, when executed, cause the apparatus to perform a computation task using the decompressed state data after storage in the first volatile memory.

15. The non-transitory computer-readable medium of claim 12, wherein the computer-executable instructions, when executed, cause the apparatus to:
cause the first subsystem to perform a task that changes the state data; and
cause the second subsystem to communicate a change message identifying the change in the state data.

16. The non-transitory computer-readable medium of claim 12, wherein the computer-executable instructions, when executed, cause the apparatus to monitor an activity level of the first subsystem and generate the first power-down command in response to the activity level falling below a threshold activity level.

17. The method of claim 7, wherein the first nonvolatile memory is operable to retain stored data when the first nonvolatile memory is not being supplied with power.

18. The apparatus of claim 1, wherein the first nonvolatile memory is a Spin Torque Transfer Random Access Memory (STT-RAM), a Phase-Change memory (PCM), a Ferroelectric Random Access Memory (FeRAM), a magnetic flip flop (MFF), or a grapheme field effect device.

* * * * *